(12) United States Patent
Narayan et al.

(10) Patent No.: US 6,902,688 B2
(45) Date of Patent: Jun. 7, 2005

(54) ELECTRICALLY CONDUCTIVE SILICONES AND METHOD OF MANUFACTURE THEREOF

(75) Inventors: Sujatha Narayan, Putnam, CT (US); Michael Lunt, Abington, CT (US); Daniel J. Kubick, Bartlett, IL (US); John A. Hamilton, Arlington Heights, IL (US)

(73) Assignee: World Properties, Inc., Lincolnwood, IL (US)

( * ) Notice: Subject to any disclaimer, the term of this patent is extended or adjusted under 35 U.S.C. 154(b) by 224 days.

(21) Appl. No.: 10/117,439

(22) Filed: Apr. 5, 2002

(65) Prior Publication Data

US 2003/0047718 A1 Mar. 13, 2003

Related U.S. Application Data

(60) Provisional application No. 60/282,027, filed on Apr. 6, 2001.

(51) Int. Cl.$^7$ .............................................. H01B 1/22
(52) U.S. Cl. ........................................ 252/512; 252/514
(58) Field of Search ........................ 252/511, 512, 252/513, 514; 528/31, 14

(56) References Cited

U.S. PATENT DOCUMENTS

| | | | |
|---|---|---|---|
| 3,583,930 A | 6/1971 | Ehrreich et al. ............. | 252/514 |
| 4,011,360 A | 3/1977 | Walsh ......................... | 428/402 |
| 4,279,783 A | 7/1981 | Kehrer et al. ............... | 252/511 |
| 4,552,688 A | 11/1985 | Sakamoto et al. .......... | 252/511 |
| 4,898,689 A | 2/1990 | Hamada et al. ............. | 252/510 |
| 5,075,038 A | 12/1991 | Cole et al. .................. | 252/514 |
| 5,182,050 A | 1/1993 | Joyce, Jr. et al. ........... | 252/500 |
| 5,348,686 A | 9/1994 | Vyas ........................... | 252/514 |
| 5,366,664 A | 11/1994 | Varadan et al. ............. | 252/512 |
| 5,384,075 A | 1/1995 | Okami ......................... | 252/511 |
| 5,498,644 A | 3/1996 | Reo ............................ | 523/218 |
| 5,910,524 A | 6/1999 | Kalinoski ................... | 523/215 |
| 5,928,569 A | 7/1999 | Reo ............................ | 252/514 |
| 5,928,570 A | 7/1999 | Reo ............................ | 252/514 |
| 5,932,145 A | 8/1999 | Mitani et al. ............... | 252/511 |
| 6,017,587 A | 1/2000 | Kleyer et al. ............... | 427/387 |
| 6,469,090 B1 * | 10/2002 | Azechi et al. .............. | 524/492 |
| 2001/0018482 A1 | 8/2001 | Azechi et al. .............. | 524/439 |

FOREIGN PATENT DOCUMENTS

| | | | |
|---|---|---|---|
| EP | 0 319 828 A2 | 11/1988 | ............. C08J/3/20 |
| EP | 0 319 828 B1 | 11/1988 | ............. C08J/3/20 |
| EP | 0 319 828 A3 | 11/1988 | ............. C08J/3/20 |
| EP | 0 367 562 A2 | 10/1989 | .......... C08L/83/07 |
| EP | 0 367 562 A3 | 10/1989 | .......... C08L/83/07 |
| EP | 0 367 562 B1 | 10/1989 | .......... C08L/83/07 |
| EP | 0 558 044 B1 | 2/1993 | ............ C08K/9/02 |
| EP | 0 558 044 A1 | 2/1993 | ............ C08K/9/02 |
| EP | 0 643 552 A1 | 6/1994 | ............ H05K/9/00 |
| EP | 0 653 463 A2 | 5/1995 | |
| EP | 0 803 542 A2 | 10/1997 | |
| EP | 0 839 870 A2 | 10/1997 | .......... C08L/83/04 |
| EP | 0 839 870 A3 | 10/1997 | .......... C08L/83/04 |
| EP | 0 839 870 A2 | 5/1998 | |
| EP | 0 971 367 A1 | 7/1999 | ............ H01B/1/22 |
| EP | 0 971 367 A1 | 1/2000 | |
| JP | 63117065 | 5/1988 | |
| JP | 4359805 | 12/1992 | |
| JP | 5325647 | 12/1993 | |
| JP | 6144951 | 5/1994 | |
| JP | 7150048 | 6/1995 | |

* cited by examiner

*Primary Examiner*—Mark Kopec
(74) *Attorney, Agent, or Firm*—Cantor Colburn LLP

(57) ABSTRACT

An electrically conductive silicone composition comprising an electrically conductive filler; organopolysiloxane mixture comprising a catalyst which promotes the addition of Si-bonded hydrogen onto alkenyl multiple bonds; an organopolysiloxane having at least two alkenyl groups per molecule; an organopolysiloxane having at least two silicon-bonded hydrogen atoms per molecule; optionally, a fluid organopolysiloxane having a viscosity less than about 1000 centipoise; and optionally, an organopolysiloxane gel formulation, the composition, when cured, having a Shore A Durometer hardness of less than or equal to about 60 measured according to ASTMD-2240 and an electrical resistivity of less than or equal to about $10^{-6}$ ohm-cm.

26 Claims, No Drawings

ELECTRICALLY CONDUCTIVE SILICONES AND METHOD OF MANUFACTURE THEREOF

CROSS-REFERENCE TO RELATED APPLICATIONS

This application claims priority to U.S. Provisional Application No. 60/282,027, filed Apr. 6, 2001, which is incorporated herein by reference in its entirety.

BACKGROUND

1. Technical Field

This invention relates to curable liquid silicone compositions, electrically conductive elastomers made from such compositions, and methods for the manufacture and use thereof.

2. Brief Description of the Related Art

Miniaturization and multi-functionality in electronic devices increasingly requires relatively thin (less than about 2.5 millimeters), soft (Shore A durometer less than or equal to about 60) gasketing materials for use on lightweight plastic components. This is true especially in applications such as, for example, cellular phones and computers. Federal and international regulations also place rigorous limits on how much electromagnetic radiation an electronic device can emit, as well as how immune the device must be to external electromagnetic interference (EMI), increasing the importance of EMI shielding in such devices.

Current approaches to gasket materials capable of EMI shielding include, for example, beryllium-copper finger stock, metal foil or metallized fabric wrapped around non-conductive foam gaskets (hereinafter FOF), non-conductive gaskets coated with conductive materials, highly filled-expanded polytetrafluoroethylene (hereinafter PTFE), and metal-based fillers loaded into silicone resins. However, these approaches lack the combination of effective EMI shielding along with the required softness and ability to be formed into thin cross sections. For example, FOF gaskets are soft and highly compressible, but are not readily wrapped with metallized fabric into complex shapes or shapes having thin cross-sections (e.g., less than about 760 micrometers, 30 mils), without leaving gaps. Filled, expanded PTFE compositions are soft, but lack physical strength, high electrical conductivity, and adequate compression set resistance.

Commercially available conductive silicone gaskets are typically gum-stock rubber based silicones compounded with conductive fillers by solid milling processes, and formed by molding. They are typically hard, having a Shore A Durometer greater than about 60. These gaskets accordingly provide poor cushioning and require high closure forces, which can cause damage to the plastic enclosure, or can require more complex assembly, creating more sites for radiation leakage. They also have poor compression set resistance values, generally greater than about 30% as per ASTM D395, Method B. This is a significant disadvantage in gasketing applications because a set in the material can cause a gap between the enclosure and the gasket, hence decreasing the shielding effectiveness.

Addition cure silicone compositions, known as "two-part" silicone compositions, are typically formed by the reaction of (a) an organopolysiloxane having at least two alkenyl groups per molecule (i.e., carbon-carbon double bonds), with (b) an organopolysiloxane having at least two silicon-bonded hydrogen atoms, in the presence of a metallic catalyst such as platinum. Electrically conductive addition cure silicone compositions have been described, for example, in U.S. Pat. No. 5,932,145 to Mitani et al., U.S. Pat. No. 6,017,587 to Kleyer et al., European Patent No. 0839870, European Patent No. 0971367, and Japanese Patent No. 63117065. These patents disclose that improved electrical conductivity in addition cure silicone compositions may be obtained by the addition of a non-reactive, volatile solvent to the uncured composition containing electrically conductive fillers, followed by removal of the solvent after cure to affect a volumetric shrinkage of the cured silicone. Similarly, U.S. Pat. No. 4,545,914 to Graiver et al. is directed to using water as a diluent, and European Patent No. 0 319828 uses volatile polydimethylsiloxane as a diluent that is eventually removed.

However, such conductive, cured silicone compositions possess low conductivity/high volume resistivity values (e.g., volume resistivity higher than about 1,000,000 ohm-centimeters), cannot be processed by liquid casting, and have poor physical properties. In particular, the cured compositions do not possess adequate softness, which is defined herein as Shore A durometer hardness of less than or equal to about 60, according to ASTM D-2240. Accordingly, there remains a need in the art for silicone elastomers that are highly electrically conductive and hence, EMI shielding, as well as soft, with good compression set resistance, and that can be made in thin cross sections, preferably through liquid casting process.

BRIEF SUMMARY

The above-described drawbacks and disadvantages are alleviated by an electrically conductive, cured silicone formed from a curable composition comprising an electrically conductive filler and a mixture of a catalyst that promotes cure of the composition, an organopolysiloxane having at least two alkenyl groups per molecule, an organopolysiloxane having at least two silicon-bonded hydrogen atoms per molecule, and optionally, an organopolysiloxane fluid having a viscosity of less than about 1000 cps, preferably wherein the organopolysiloxane mixture has a viscosity of less than about 100,000 cps, preferably less than about 50,000 cps, and most preferably less than about 35,000 cps; and.

Further disclosed is an electrically conductive, cured silicone formed from a composition comprising an electrically conductive filler and a mixture of a catalyst that promotes cure of the composition, an organopolysiloxane having at least two alkenyl groups per molecule, an organopolysiloxane having at least two silicon-bonded hydrogen atoms per molecule, a curable silicone gel formulation, an organopolysiloxane fluid having a viscosity of less than about 1000 cps, the mixture of the organopolysiloxanes preferably having a viscosity of less than about 100,000 cps, preferably less than about 50,000 cps, and most preferably less than about 35,000 cps.

The silicones resulting from cure of the above compositions have a Shore A Durometer hardness of less than or equal to about 60 measured according to ASTM D-2240. The may also have a compression set resistance of less than about 30% measured according to ASTM D-395-Method B at 100° C., under 25% compression for 70 hours. Such properties render the cured silicones ideal for gasketing and EMI shielding. These conductive silicones may be continuously manufactured in a roll form by liquid casting system, allowing the controlled manufacture of a range of cross sections.

The above discussed and other features and advantages of the present invention will be appreciated and understood by those skilled in the art from the following detailed description.

DETAILED DESCRIPTION

Disclosed herein are curable, two-part silicone compositions that allow the incorporation of electrically conductive fillers in amounts effective to produce electrically conductive, soft silicone elastomers that are useful as electrically conductive and EMI shielding gasketing. These advantageous properties are provided by use of a low durometer liquid silicone rubber (hereinafter LSR) or liquid injection moldable (hereinafter LIM) composition, optionally comprising a curable silicone gel and/or reactive or non-reactive low viscosity non-volatile silicone fluids, into which electrically conductive fillers are incorporated. Use of a curable silicone gel and/or a reactive or non-reactive low viscosity non-volatile silicone in particular allows incorporation of higher filler quantities, while maintaining castability and physical properties such as softness. The amount of gel relative to LSR or LIM can accordingly be adjusted to allow tailoring of filler level and viscosity of the composition, and thus softness, electrical conductivity, and other properties in the cured silicone elastomer. Similarly, use of a reactive or non-reactive low viscosity, non-volatile organopolysiloxane fluid allows even higher quantities of filler to be incorporated into the cured silicone composition, thus allowing even greater conductivity.

LSR or LIM systems are generally provided as two-part formulations suitable for mixing in ratios of about 1:1 by weight or volume. One part typically contains one or more organopolysiloxanes having at least two alkenyl groups, catalyst, any fillers other than conductive fillers, and optional additives. The second part typically contains one or more organopolysiloxanes having at least two alkenyl groups, one or more organopolysiloxanes having at least two silicon-bonded hydrogen atoms per molecule, any fillers other than conductive fillers, and optional additives. In the absence of the conductive filler, and when used without the addition of the curable silicone gel formulation or the reactive or non-reactive silicone fluid, the combined first and second parts has a viscosity of less than about 100,000 centipoise (cps), preferably less than about 50,000 cps, and most preferably less than about 35,000 cps. Alternatively, or in addition, when used without the addition of the curable silicone gel formulation or the reactive or non-reactive silicone fluid, the combination of the two parts without the conductive filler has a neat extrusion rate of less than about 500 g/minute measured according to ASTM C-603.

Suitable organopolysiloxanes having at least two alkenyl groups per molecule are generally represented by the formula:

$$M_a D_b T_c Q_d,$$

wherein the subscripts a, b, c, and d are zero or a positive integer, subject to the limitation that if subscripts a and b are both equal to zero, subscript c is greater than or equal to two; M has the formula $R_3SiO_{1/2}$; D has the formula $R_2SiO_{2/2}$; T has the formula $RSiO_{3/2}$; and Q has the formula $SiO_{4/2}$, wherein each R group independently represents hydrogen, alkenyl groups, substituted and unsubstituted monovalent hydrocarbon groups having from one to forty, preferably one to six carbon atoms each, subject to the limitation that at least two of the R groups are alkenyl R groups. Suitable alkenyl R-groups are exemplified by vinyl, allyl, butenyl, pentenyl, hexenyl, and heptenyl, with vinyl being particularly preferred. The alkenyl group can be bonded at the molecular chain terminals, in pendant positions on the molecular chain, or both.

Other silicon-bonded organic groups in the organopolysiloxane having at least two alkenyl groups, when present, are exemplified by substituted and unsubstituted monovalent hydrocarbon groups having from one to forty carbon atoms. For example, alkyl groups such as methyl, ethyl, propyl, butyl, pentyl, and hexyl; aryl groups such as phenyl, tolyl, and xylyl; aralkyl groups such as benzyl and phenethyl; and halogenated alkyl groups such as 3-chloropropyl and 3,3,3-trifluoropropyl. Methyl and phenyl are specifically preferred.

The alkenyl-containing organopolysiloxane can have straight chain, partially branched straight chain, branched-chain, or network molecular structure, or may be a mixture of such structures. The preferred alkenyl-containing organopolysiloxane is exemplified by trimethylsiloxy-endblocked dimethylsiloxane-methylvinylsiloxane copolymers; trimethylsiloxy-endblocked methylvinylsiloxane-methylphenylsiloxane copolymers; trimethylsiloxy-endblocked dimethylsiloxane-methylvinylsiloxane-methylphenylsiloxane copolymers; dimethylvinylsiloxy-endblocked dimethylpolysiloxanes; dimethylvinylsiloxy-endblocked methylvinylpolysiloxanes; dimethylvinylsiloxy-endblocked methylvinylphenylsiloxanes; dimethylvinylsiloxy-endblocked dimethylvinylsiloxane-methylvinylsiloxane copolymers; dimethylvinylsiloxy-endblocked dimethylsiloxane-methylphenylsiloxane copolymers; dimethylvinylsiloxy-endblocked dimethylsiloxane-diphenylsiloxane copolymers; and mixtures comprising at least one of the foregoing organopolysiloxanes.

A suitable organopolysiloxane having at least two silicon-bonded hydrogen atoms per molecule is generally represented by the formula:

$$M'_a D'_b T'_c O'_d$$

wherein the subscripts a, b, c, and d are zero or a positive integer, subject to the limitation that if subscripts a and b are both equal to zero, subscript c is greater than or equal to two; M' has the formula $R_3SiO_{1/2}$; D' has the formula $R_2SiO_{2/2}$; T' has the formula $RSiO_{3/2}$; and Q' has the formula $SiO_{4/2}$, wherein each R group independently represents hydrogen, substituted and unsubstituted monovalent hydrocarbon groups having from one to forty, preferably one to six carbon atoms each, subject to the limitation that at least two of the R groups are hydrogen. Preferably, each of the R groups of the organopolysiloxane having at least two silicon-bonded hydrogen atoms per molecule are independently selected from hydrogen, methyl, ethyl, propyl, butyl, pentyl, hexyl, aryl, phenyl, tolyl, xylyl, aralkyl, benzyl, phenethyl, halogenated alkyl, 3-chloropropyl, 3,3,3-trifluoropropyl, and combinations comprising at least one of the foregoing. Methyl and phenyl are specifically preferred.

The hydrogen can be bonded at the molecular chain terminals, in pendant positions on the molecular chain, or both. The hydrogen-containing organopolysiloxane component can have straight chain, partially branched straight chain, branched-chain, cyclic, or network molecular structure, or may be a mixture of two or more selections from organopolysiloxanes with the exemplified molecular structures.

The hydrogen-containing organopolysiloxane is exemplified by trimethylsiloxy-endblocked methylhydrogenpolysiloxanes; trimethylsiloxy-endblocked dimethylsiloxane-methylhydrogensiloxane copolymers; trimethylsiloxy-endblocked methylhydrogensiloxane-methylphenylsiloxane copolymers; trimethylsiloxy-endblocked dimethylsiloxane-methylhydrogensiloxane-methylphenylsiloxane copolymers; dimethylhydrogensiloxy-endblocked dimethylpolysiloxanes; dimethylhydrogensiloxy-endblocked methylhydrogenpolysiloxanes; dimethylhydrogensiloxy-endblocked dimethylsiloxanes-methylhydrogensiloxane copolymers; dimethylhydrogensiloxy-endblocked dimethylsiloxane-methylphenylsiloxane copolymers; and dimethylhydrogensiloxy-endblocked methylphenylpolysiloxanes.

The hydrogen-containing organopolysiloxane component is used in an amount sufficient to cure the composition, preferably in a quantity that provides from about 1.0 to about 10 silicon-bonded hydrogen atoms per alkenyl group in the alkenyl-containing organopolysiloxane. When the number of silicon-bonded hydrogen atoms per alkenyl group exceeds 10, foam may be produced during cure and for the heat resistance of the resulting cured silicone may progressively decline.

The curable composition further comprises, generally as a component of the part containing the organopolysiloxane having at least two alkenyl groups per molecule, a hydrosilylation-reaction catalyst. Effective catalysts promote the addition of silicon-bonded hydrogen onto alkenyl multiple bonds to accelerate the cure. Such catalyst can include a noble metal, such as, for example, platinum, rhodium, palladium, ruthenium, iridium, or a combination comprising at least one of the foregoing. The catalyst can also include a support material, preferably activated carbon, aluminum oxide, silicon dioxide, thermoplastic resin, and combinations comprising at least one of the foregoing.

Platinum and platinum compounds known as hydrosilylation-reaction catalysts are preferred, and include, for example platinum black, platinum-on-alumina powder, platinum-on-silica powder, platinum-on-carbon powder, chloroplatinic acid, alcohol solutions of chloroplatinic acid platinum-olefin complexes, platinum-alkenylsiloxane complexes and the catalysts afforded by the microparticulation of the dispersion of a platinum addition-reaction catalyst, as described above, in a thermoplastic resin such as methyl methacrylate, polycarbonate, polystyrene, silicone, and the like. Mixtures of catalysts may also be used.

A quantity of catalyst effective to cure the present composition is used, generally from about 0.1 to about 1,000 parts per million by weight (ppm) of metal (e.g., platinum) based on the combined amounts of the reactive organopolysiloxane components.

Other additives known in the art may be present in either of the curable polyorganosiloxane compositions, for example non-conductive reinforcing fillers, UV stabilizers, or pigments. Reinforcing fillers, typically fumed silica, may be present in one or both parts, in amounts of about 10 to about 30% by weight of each part.

The curable composition may further comprise a curable silicon gel formulation and/or a reactive or non-reactive silicone fluid. Unlike prior art compositions and methods that use volatile solvents, the gel or fluid is not subsequently removed from the cured silicone. The silicone gel or reactive fluid becomes part of the polymer matrix, leading to low outgassing and little or no migration to the surface during use. The boiling point of the non-reactive silicone fluid (when used) is preferably high enough such that it is dispersed in the polymer matrix, does not evaporate during or after cure, and does not migrate to the surface or outgas. Use of the silicone gel or an organopolysiloxane fluid component in accordance obviates the need for an extra step during processing to remove the fluid, and minimizes possible outgassing and/or migration of fluid during use.

Silicone gels are lightly cross-linked fluids or under-cured elastomers. They are unique in that they range from very soft and tacky to moderately soft and only slightly sticky to the touch. Use of a gel formulation decreases the viscosity of the composition significantly, thereby allowing at least one of an increased filler loading, enhanced filler wetting, and enhanced filler distribution, thereby resulting in cured compositions having lower resistance and resistivity values and increased softness. Suitable gel formulations may be either two-part curable formulations or one-part formulations. The components of the two-part curable gel formulations is similar to that described above for LSR systems (i.e., an organopolysiloxane having at least two alkenyl groups per molecule and an organopolysiloxane having at least two silicon-bonded hydrogen atoms per molecule). The main difference lies in the fact that no filler is present, and that the molar ratio of the silicon bonded hydrogen groups (Si-H) groups to the alkenyl groups is usually less than one, and can be varied to create a "under-cross linked" polymer with the looseness and softness of a cured gel. Preferably, the ratio of silicone-bonded hydrogen atoms to alkenyl groups is less than 1.0, less than about 0.75, less than about 0.6, or less than about 0.1. An example of a suitable two-part silicone gel formulation is SYLGARD® 527 gel (Dow Corning Corporation).

Suitable reactive or non-reactive organopolysiloxane fluids have a viscosity of less than about 1000 cps, preferably less than about 750 cps, more preferably less than about 600 cps, and most preferably less than about 500 cps. The organopolysiloxane fluid component is added to decrease the viscosity of the composition, thereby allowing at least one of increased filler loading, enhanced filler wetting, and enhanced filler distribution, and resulting in cured compositions having lower resistance and resistivity values. Use of the organopolysiloxane fluid component may also reduce the dependence of the resistance value on temperature, and/or reduce the time-wise variations in the resistance and resistivity values. The organopolysiloxane fluid should not inhibit the curing reaction, i.e., the addition reaction, of the composition but it may or may not participate in the curing reaction.

The organopolysiloxane fluid is generally represented by the formula:

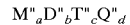

$$M''_a D''_b T''_c Q''_d$$

wherein the subscripts a, b, c, and d are zero or a positive integer, subject to the limitation that the sum of the subscripts a, b, and c is one or greater; M" has the formula $R_3SiO_{1/2}$; D" has the formula $R_2SiO_{2/2}$; T" has the formula $RSiO_{3/2}$; and Q" has the formula $SiO_{4/2}$, wherein each R group independently represents hydrogen, substituted and unsubstituted hydrocarbon groups having from one to forty, preferably one to six carbon atoms each. Preferably, each R group is independently selected from the group consisting of hydrogen, methyl, ethyl, propyl, butyl, pentyl, hexyt, aryl, phenyl, tolyl, xylyl, aralkyl, benzyl, phenethyl, halogenated alkyl, 3-chloropropyl, 3,3,3-trifluoropropyl, vinyl, allyl, butenyl, pentenyl, hexenyl, heptenyl, and combinations comprising at least one of the foregoing.

Reactive organopolysiloxane fluids co-cure with the alkenyl-containing organopolysiloxane and the organopolysiloxane having at least two silicon-bonded hydrogen atoms, and therefore may themselves contain alkenyl groups or silicon-bonded hydrogen groups. Such compounds may have the same structures as described above in connection with the alkenyl-containing organopolysiloxane and the organopolysiloxane having at least two silicon-bonded hydrogen atoms, but in addition have a viscosity of less than about 1000 cps, and preferably have a boiling point greater than the curing temperature of the addition cure reaction, i.e., greater than or equal to about 260° C. (500° F.).

The non-reactive organopolysiloxane fluid has a boiling point greater than or equal to about 260° C. (500° F.), and may be branched or straight-chained. Because the non-reactive organopolysiloxane is fluid and has a significantly higher boiling point, it allows the incorporation of higher quantities of filler, but does not migrate or outgas. Examples of non-reactive organopolysiloxane fluids include DC 200 from Dow Corning Corporation.

The silicone gel formulation and/or organopolysiloxane fluid component is present in amount effective to allow the addition, incorporation, and wetting of higher quantities of conductive filler. This is generally an amount effective to produce an organopolysiloxane (plus catalyst and any non-conducting additives) mixture having a viscosity of less than about 100,000 cps, preferably less than about 50,000 cps, and most preferably less than about 35,000 cps. Alternatively, or in addition, the organopolysiloxane (plus catalyst and any non-conducting additives) mixture has a neat extrusion rate of less than about 500 g/minute measured according to ASTM C-603.

Particular quantities will therefore depend on a number of factors, including the viscosity or extrusion rate of the LSR, LIM, gel, or fluid formulations, the amount of nonconductive filler present, the amount of conductive filler present, the desired physical properties of the cured silicone, and similar considerations. In general, the silicone gel formulation comprises less than or equal to about 80, preferably less than or equal to about 65 weight percent (wt. %) of the total polysiloxane (plus catalyst and any non-conducting additives) mixture. Preferably, greater than about 5, preferably greater than about 10, more preferably 30 wt. % of the total polysiloxane (plus catalyst and any non-conducting additives) mixture is used. The amount of organopolysiloxane fluid is about 5 to about 50 wt. % of the total polysiloxane (plus catalyst and any non-conducting additives) mixture. Preferably within this range, the organopolysiloxane fluid is greater than or equal to about 5, more preferably greater than or equal to about 7.5, even more preferably greater than or equal to about 10 wt. % of the total polysiloxane mixture. Also within this range, the organopolysiloxane fluid concentration is less than or equal to about 50, more preferably less than or equal to about 25, even more preferably less than or equal to about 20 wt. %.

Suitable electrically conductive fillers include, without limitation, carbon, such as graphite, carbon black, vapor grown carbon fibers, and carbon nanotubes; and conductive metals. Particulate and micro particulate conductive materials that create electrical conductivity in the cured silicone are exemplified by powders and micro powders of gold, silver, nickel, copper, and the like, as well as alloys containing at least one of the foregoing metals; and by the powders and micro powders fabricated by the vacuum deposition, or plating, of a metal such as gold, silver, nickel, copper, and their alloys, and the like, onto the surface of a ceramic, glass, quartz, or organic resin micropowder, and the like. Examples of fillers that fit the above descriptions are silver, silver-coated aluminum, silver-coated copper, silver-coated solid and hollow glass, silver-coated ceramic, nickel, nickel-coated graphite, carbon, and the like.

To obtain highly conductive cured silicones with volume resistivity of about 10 to about 0.001, preferably about 10 to about $10^{-6}$ ohm-cm, the conductive filler is preferably based on metals such as silver, nickel, and/or copper. The shape of the filler can be irregular, spherical, flake, dendritic flake, or fiber. Silver coated hollow ceramic or glass microspheres are preferred for the combined advantage of low weight, low density, high electrical conductivity (low resistivity), processability, and cost. Nickel coated graphite powder, particularly powder comprising about 60% nickel by weight, is preferable for relatively lower filler cost, corrosion resistance, burn resistance, and adequate EMI shielding.

The conductive filler is added in quantities effective to achieve the desired resistivity. Particular quantities will vary depending on the desired conductivity, the type and shape of the filler, the silicone formulation, and similar considerations. Generally, for graphite, carbon black, metal, or metal-coated fillers, about 10 to about 90 wt. % of filler is effective, based on the total weight of the curable composition, the remainder being the organopolysiloxane mixture described above. Preferably, within this range, the metal or metal-coated conductive filler concentration is greater than or equal to about 20 wt. % of the total weight of the curable composition. Also within this range, the conductive filler concentration is less than or equal to about 85 wt. % of the total weight of the curable composition. The cured silicone exhibits a progressively unsatisfactory conductivity when the addition of filler to the composition falls below the lower limit of the specified range. When the addition of filler exceeds the upper limit of the range, the composition exhibits progressively higher hardness, higher viscosity, and hence, poorer processability. Where highly conductive fillers such as vapor grown carbon fibers or carbon nanotubes are used, alone or in combination with the above fillers, smaller quantities may be effective, i.e., about 0.1 to about 10 wt. % when used alone, or about 0.1 to about 90 wt. % when used in combination with graphite, carbon black, metal, or metal-coated conductive fillers.

Electrical resistivity of the cured composition and viscosity of the mixture depends on the particle size of the conductive filler, and the particle size distribution. The average largest dimension of conductive fillers such as graphite, carbon black, metal, or metal-coated conductive fillers is about 35 to about 150 micrometers. Preferably within this range, the average largest dimension is greater than or equal to about 40 microns. Also within this range, the average particle size of the conductive filler is preferably less than or equal to about 110 micrometers. This average size can be achieved with single filler, or a mixture of fillers having various average particle sizes. It is sometimes found in the liquid casting process that as the mixture goes between two rolls of the coater, the use of larger particle size fillers causes pinholes or tears in the elastomer when made at thin cross sections (e.g., less than or equal to about 760 micrometers, 32 mils). Mixing larger size filers (e.g., those having an average longest dimension of about 90 micrometers) and smaller size fillers (e.g., those having an average longest dimension of about 45 micrometers) appropriately alleviates this problem It is known in the art that when silver based fillers are added in large quantities to a platinum catalyzed system, poisoning of the catalyst occurs, which causes uncured or poorly cured elastomer that is low in strength. Additional platinum may be added, for example SYLOFF 4000 from Dow Coming. However, when a large amount of platinum is added to improve cure, the pot life or working time can be adversely affected. Methyl vinyl cyclics can be used in this situation as a cure retardant, for example 1-2287 Cure Inhibitor (Dow Corning). Such materials bind the platinum at room temperature to prevent cure and hence, improve the working time, but release the platinum at higher temperatures to affect cure in the oven in the required period of time. The level of platinum and cure retardant can be adjusted to alter cure time and working time/pot life. The excess platinum level is typically about 0 to about 1 wt. % of the total weight of polysiloxane mixture and filler and other additives. Preferably, within this range, the additional platinum concentration (i.e., the amount over that required) is greater than or equal to about 0.05 wt. %, more preferably greater than or equal to about 0.15 wt % based on the total weight of polysiloxane mixture. Also within this range, the additional platinum concentration is less than or equal to about 0.6 wt. %, more preferably less than or equal to about 0.45 wt. %, depending on type and amount of filler used.

The cure retardant concentration is about 0 to about 0.3 wt % of the total composition. Preferably, within this range, the cure retardant concentration is greater than or equal to about 0.005 wt %, more preferably greater than or equal to about 0.025 wt % based on the total weight of the polysiloxane mixture. Also within this range, the cure retardant concentration is less than or equal to about 0.2% by weight, more preferably less than or equal to about 0.1% by weight based on the total weight of polysiloxane mixture and the required working time or pot life.

A high crosslink density silicone fluid containing hydrogen bonded to silicon can also be used to overcome this problem. It appears that the large number of functional groups helps to improve the cure kinetics without the need for platinum and hence, there is no issue of pot life. A suitable crosslinker concentration is about 0, to about 0.5% by weight, based on the total weight of the polysiloxane mixture. An example of a suitable crosslinker is available under the trade name "1107 Fluid" from Dow Corning Corp.

Molecular sieves can be mixed into the formulation to remove any water associated with a silver filler and other components of the composition. Use of molecular sieve appears to help reduce the poisoning of the catalyst. Typical amounts of the sieve are up to about 5 wt. %, based on the total weight of the curable composition. Preferably, within this range, the sieve concentration is greater than or equal to about 1 wt. %, more preferably greater than or equal to about 1.5 wt. %. Also within this range, the sieve concentration is less than or equal to about 3 wt. %, more preferably less than or equal to about 2.5 wt. %. An example of a suitable sieve is 3A sieves from UOP Corporation.

A convenient method for preparing the cured silicone from the compositions described above is mixing the different components to homogeneity and removal of air by degassing under vacuum. The composition is then poured onto a release liner and cured by holding the composition at room temperature (e.g., 25° C.), or by heating. When a non-reactive organopolysiloxane fluid is present, cure is at a temperature below the boiling point of the fluid so as to substantially prevent removal of the fluid during cure. Preferably, cure temperatures are at least about 20° C., preferably at least about 50° C., most preferably at least about 80° C. below the boiling point of the fluid component. When using reactive fluid, the cure temperature is such that the fluid cures before it can be driven off.

In a preferred continuous method, the appropriate amounts of each component is weighed into a mix vessel, for example, a Ross pot/kettle, followed by mixing under vacuum until homogeneity is achieved. The mixture is then transferred onto a moving carrier. Another layer of carrier film is then pulled though on top of the mixture and the sandwiched mixture is then pulled through a coater, which determines the thickness of the final elastomer. The composition is then cured, followed by an optional post-cure.

For ease of subsequent manufacture and lower cost, the conductive silicones described herein are particularly suitable for continuous manufacture in a roll form. This allows the manufacture of electrically conductive silicone elastomers from a liquid composition by casting continuous rolls in sheet form at varying thicknesses, with better thickness tolerance. The present compositions may be used to make sheets having a cross-section less than 6.3 mm (0.250 inches), preferably in very thin cross sections such as about 0.254 mm to about 2.54 mm (about 0.01 to about 0.1 inches), which is useful, for example, in electronic applications. These embodiments detailed above impart to the elastomer advantageous properties, which permit such elastomers to be used as gasketing and for other purposes in a variety of commercial applications such as cell phones, computers, airplanes and other articles of commerce where hitherto only metal sheets and metallized meshes would be used.

In a particularly advantageous feature, the cured composition is not subsequently treated to remove the diluent (gel or fluid), resulting in a more efficient process. The cured silicone compositions have a number of advantageous properties, in that they are soft, highly electrically conductive (and therefore capable of shielding from electromagnetic interference), have good compression set, and can be made in thin cross sections in continuous roll form with good thickness tolerance.

Preferably, the cured silicones have a Shore A durometer of less than or equal to about 60, preferably less than or equal to about 55, and more preferably less than or equal to about 50.

Where desired, the cured silicones can also be formulated to have a compression set resistance of less than about 30%, preferably less than about 25%, even more preferably less than about 15%, measured at 100° C. under 25% compression for 70 hours.

The volume resistivity of the elastomers can be adjusted from about $10^2$ to about $10^{-6}$ ohm-cm, depending on the type and amount of fillers used. Preferably, the resistivity is less than or equal to about 10 ohm-cm, preferably less than or equal to about 1 ohm-cm, more preferably less than or equal to about 0.1 ohm-cm, and most preferable less than or equal to about $10^{-2}$ ohm-cm.

The invention is further demonstrated by the following non-limiting examples.

EXAMPLES

The following materials were used:

TABLE 1

| Trade Name | Source | Description |
|---|---|---|
| LIM 6010A | General Electric | Vinyl-terminated polydimethylsiloxane compounded with filler and catalyst Viscosity = 30,000 cp Extrusion Rate 225 g/min |
| LIM 6010B | General Electric | Vinyl-terminated polydimethylsiloxane and Hydride-terminated polydimethylsiloxane compounded with filler/crosslinker Viscosity = 30,000 cps Extrusion Rate 225 g/min |
| DC-200 | Dow Corning | Polydimethylsiloxane fluid Viscosity = 20–100 centistokes |
| SFD-119 | Dow Corning | Vinyl-terminated polydimethylsiloxane Viscosity = 450 cps |
| RTV 609 | GE Silicones | Linear vinyl-terminated polydimethylsiloxane Viscosity = 3500 cps |
| SYLGARD 527 | Dow Corning | Polyorganosiloxane gel formulation (two-part) |

TABLE 1-continued

| Trade Name | Source | Description |
| --- | --- | --- |
| Gel A | | Viscosity = 425 cps |
| SYLGARD 527 Gel B | Dow Corning | Polyorganosiloxane gel formulation (two-part) Viscosity = 425 cps |
| SYLGARD 182-Base | Dow Corning | Vinyl-terminated polydimethylsiloxane Viscosity = 3900 cps |
| SYLGARD 182-Curing Agent | Dow Corning | Hydride-terminated polydimethylsiloxane (Crosslinking agent) Viscosity = 3900 cps |
| SYLOFF 4000 | Dow Corning | Platinum catalyst |
| AG SF-20 | PQ Corp. | Silver-coated hollow ceramic microspheres Average particle Size = 45 micrometers |
| 2429S | PQ Corp. | Silver coated solid glass spheres Average particle size = 92 micrometers |
| SA270720 | PQ Corp. | Silvered aluminum flakes Average particle size = 44 micrometers |
| SC325P17 | PQ Corp. | Silver coated copper powder Average particle size = 45 micrometers |
| S3000-S3M | PQ Corp. | Silver coated solid glass spheres Average particle size = 42 micrometers |
| AG clad filament | PQ Corp. | Silver coated glass fibers 763 micrometers screen size |
| AVCARB 401 | | Carbon fibers Diameter = 7 micrometers |
| 75% NCG | Novamet | 75% Nickel coated graphite powder Average particle size = 45 micrometers |
| 60% NCG | Novamet | 60% Nickel coated graphite powder Average particle size = 90 micrometers |
| SH230S33 | PQ Corp. | Silver coated hollow glass spheres Average particle size = 43 micrometers |
| SH400S33 | PQ Corp. | Silver coated hollow glass spheres Average particle size = 15 micrometers |
| AGSL-150-30-TRD | PQ Corp. | 30% Silver coated hollow ceramic microsphere Average particle size = 91 micrometers |
| AGSL-150-16-TRD | PQ Corp. | 16% Silver coated hollow ceramic microsphere Average particle size = 91 micrometers |

The components as shown in Tables 2 through 7 (all in parts by weight) were mixed by hand, then coated onto a roll-over-roll coater between two layers of release liner and cured between about 100° C. and about 140° C., for example, for about 15 to about 20 minutes.

To make solid elastomers and eliminate all air entrapped due to mixing, the reactive composition may be degassed, for example under vacuum.

Tensile strength and elongation were measured using an Instron fitted with a 50-pound load cell and using 10–20 pound range depending on thickness and density. Tensile strength is calculated as the amount of force (psi) at the break divided by the sample thickness and multiplied by two. Elongation is reported as percent extension.

Tear strength was measured using an Instron fitted with a 50-pound load cell and using a 2-, 5-, or 10-pound load range depending on sample thickness and density. Tear strength is calculated by dividing the force applied at tear by the thickness of the sample.

Compression set is the amount, measured in percent, by which a standard test piece fails to return to its original thickness after being subjected to 25% compression for 22 hours at 100° C.

Special electrical equipment and test fixtures were used to measure volume resistivity. The fixture is a custom fabricated press with gold plated, 2.54 cm diameter, and electrical contacts. The fixture is equipped with a digital force gauge that allows the operator to control and make adjustments to the force that is applied to the surface of the sample. The Power supply is capable of supplying 0 to 2 amps to the sample surface. The Voltage drop and ohms across the sample are measured using a HP 34420A Nano Volt/Micro Ohmmeter. The electronic components of the fixture are allowed to warm up and, in the case of the HP 34420 A, the internal calibration checks are done. The samples are allowed to equilibrate, for a period of 24 hours, to the conditions of the test environment. Typical test environment is 50% Relative Humidity (% RH) with a room temp of 23° C. (70° F.). The sample to be tested is placed between the platens of the test fixture and a load is applied to the surface. The applied load is dependent on the type of sample to be tested, soft elastomers are tested using small loads while solids are tested using a load range from about 63,279 to about 210,930 kg/square meter (90 to 300 PSI pounds per square inch). Once the load has been applied, the current is applied to the sample and the voltage drop through the sample thickness is measured. A typical test would include measurements at 4 different amp settings, 0.5, 1.0, 1.6, and 2.0 amps. For a conductive composite the resulting calculated volume resistivity for all four of the amp settings will be similar. The calculation for the volume resistivity:

$$\text{Volume resistivity (ohm-cm)} = (E/I)*(A/T)$$

wherein:
E=voltage drop (V)
I=current (amps)
A=area (cm$^2$)
T=thickness (cm).

Table 2 shows the use of different fillers in the LIM 6010 A&B silicone system at filler loadings of 50% by volume. It demonstrates the use of a variety of fillers that can be used in this base and their effect on, viscosity, and electrical resistivity.

TABLE 2

|  | A(1) | B(2) | C(3) | D(9) | E(4) | F(5) | G(7) |
|---|---|---|---|---|---|---|---|
| Component |  |  |  |  |  |  |  |
| LIM 6010A | 19.23 | 9.00 | 21.28 | 40 | 20.83 | 37.04 | 10.88 |
| LIM 6010B | 19.23 | 9.00 | 21.28 | 40 | 20.83 | 37.04 | 10.88 |
| SA270S20 | 61.54 | 0 | 0 | 0 | 0 | 0 | 0 |
| SC325P17 | 0 | 81.2 | 0 | 0 | 0 | 0 | 0 |
| S3000-S3M | 0 | 0 | 57.44 | 0 | 0 | 0 | 0 |
| SH230S33 | 0 | 0 | 0 | 20 | 0 | 0 | 0 |
| Ag Clad Filament | 0 | 0 | 0 | 0 | 58.34 | 0 | 0 |
| AGSF20 | 0 | 0 | 0 | 0 | 0 | 25.92 | 0 |
| 75% NCG | 0 | 0 | 0 | 0 | 0 | 0 | 78.24 |
| TOTAL | 100 | 100 | 100 | 100 | 100 | 100 | 100 |
| Properties |  |  |  |  |  |  |  |
| Viscosity (cps) | >2 million | >2 million | >2 million | >2 million | >2 million | 1.9 million | >2 million |
| Volume resistivity (ohm-cm) | 0.04 | 0.05 | 0.07 | 0.32 | 0.77 | 1.24 | 1.33 |

Table 3 shows a combination of LIM 6010 LSR with silicon gel, using Ag SF 20 filler at 60% volume loading. It shows the decrease in viscosity and increase in softness of the final elastomer when the amount of gel in the mixture is increased. Column N of Table 3 also shows the use of additional 10:1 two-part platinum catalyzed silicone system that can be used to modify physical properties.

TABLE 3

|  | H(6) | I(7) | J(8) | K(15) | L(20) | M(9) | N(146) |
|---|---|---|---|---|---|---|---|
| Component |  |  |  |  |  |  |  |
| LIM 6010A | 29 | 21.75 | 14.5 | 10.99 | 11.6 | 7.25 | 6.5 |
| LIM 6010B | 29 | 21.75 | 14.5 | 10.99 | 11.6 | 7.25 | 6.5 |
| SYLGARD 527 GEL A | 0 | 7.25 | 14.5 | 16.49 | 17.4 | 21.75 | 13.5 |
| SYLGARD 527 GEL B | 0 | 7.25 | 14.5 | 16.49 | 17.4 | 21.75 | 13.5 |
| SYLGARD 182 | 0 | 0 | 0 | 0 | 0 | 0 | 0.15 |
| SYLGARD 182 | 0 | 0 | 0 | 0 | 0 | 0 | 0.05 |
| AGSF 20 | 42 | 42 | 42 | 42 | 42 | 42 | 40.5 |
| TOTAL | 100 | 100 | 100 | 100 | 100 | 100 | 100 |
| Property |  |  |  |  |  |  |  |
| Viscosity (kilo cps) | 1580 | 360 | 70 | 62 | 34 | 17 |  |
| Durometer (Shore A) | 50 | 47.5 | 30 | 20 | 17.5 | 10 | 35 |
| Volume Resistivity (ohm-cm) | 0.37 | 1.48 | 0.57 | 0.10 | 0.13 | 0.21 | 0.19 |

Table 4 demonstrates the effect of reactive (SFDL 19) and non-reactive fluids (DC200) on the viscosity of the base resin mixture with AG SF20 filler loaded to 60% by volume.

TABLE 4

|  | N(23) | O(24) | P(25) | Q(33) | R(34) | S(35) | T(36) | U(37) |
|---|---|---|---|---|---|---|---|---|
| Component |  |  |  |  |  |  |  |  |
| LIM 6010A | 26.5 | 24 | 21.5 | 26.5 | 24 | 21.5 | 19 | 16.5 |
| LIM 6010B | 26.5 | 24 | 21.5 | 26.5 | 24 | 21.5 | 19 | 16.5 |
| SFD 119 | 5 | 10 | 15 | 0 | 0 | 0 | 0 | 0 |
| DC 200 | 0 | 0 | 0 | 5 | 10 | 15 | 20 | 25 |
| AGSF20 | 42 | 42 | 42 | 42 | 42 | 42 | 42 | 42 |
| TOTAL | 100 | 100 | 100 | 100 | 100 | 100 | 100 | 100 |
| Properties |  |  |  |  |  |  |  |  |
| Viscosity (kilo cps) | 830 | 527 | 404 | 816 | 514 | 302 | 120 | 59 |
| Durometer (Shore A) | 47.5 | 35 | 10 | 45 | 40 | 37.5 | 32.5 | 25 |
| Volume Resistivity (ohm-cm) | 0.21 | 0.11 | 0.09 | 0.47 | 0.27 | 0.15 | 0.15 | 0.06 |

Electrical resistivity and Durometer can be modified depending on required application, using a mixture of fillers. Table 5 shows this for silver coated ceramic micro spheres.

TABLE 5

|  | V(53) | W(54) | X(55) | Y(56) | Z(57) | AA(58) |
|---|---|---|---|---|---|---|
| Component |  |  |  |  |  |  |
| LIM 6010A | 9.25 | 9.50 | 10.50 | 11.50 | 12.50 | 13.50 |
| LIM 6010B | 9.25 | 9.50 | 10.50 | 11.50 | 12.50 | 13.50 |
| SYLGARD 527 Gel A | 9.25 | 9.50 | 10.50 | 11.50 | 12.50 | 13.50 |
| SYLGARD 527 Gel B | 9.25 | 9.50 | 10.50 | 11.50 | 12.50 | 13.50 |
| AGSL-150-30 TRD | 66.0 | 55.0 | 44.0 | 33.0 | 22.0 | 11.0 |
| AGSF-20 | 0 | 7.0 | 14.0 | 21.0 | 28.0 | 35 |
| TOTAL | 103 | 100 | 100 | 100 | 100 | 100 |
| Properties |  |  |  |  |  |  |
| Durometer (Shore A) | 35 | 30 | 20 | 18 | 30 | 25 |
| Volume Resistivity (ohm-cm) | 0.01 | 0.02 | 0.04 | 0.07 | 0.05 | 0.18 |

Electrical resistivity of the composition is closely related to the amount of filler that is added. Table 6 shows that a filler level can lead to lower electrical conductivity and a higher loading level can increase the viscosity and hardness. "Overload" implies the material is not conductive enough to register a reading in the tester.

TABLE 6

|  | AB(81) | AC(82) | AD(83) | AE(84) | AF(85) | AG(86) |
|---|---|---|---|---|---|---|
| Components |  |  |  |  |  |  |
| LIM 6010A | 11.25 | 10 | 8.75 | 7.5 | 6.25 | 5 |
| LIM 6010B | 11.25 | 10 | 8.75 | 7.5 | 6.25 | 5 |
| SYLGARD 527 Gel A | 11.25 | 10 | 8.75 | 7.5 | 6.25 | 5 |
| SYLGARD 527 Gel B | 11.25 | 10 | 8.75 | 7.5 | 6.25 | 5 |
| 75% NCG | 55 | 60 | 65 | 70 | 75 | 80 |
| TOTAL | 100 | 100 | 100 | 100 | 100 | 100 |
| Viscosity | Low | Low | Med | Med | High | High |
| Durometer (Shore A) |  |  | 35 | 40 | 55 |  |
| Volume Resistivity (Ohm-cm) | Overload | Overload | 1400 | 650 | 60 | 31 |

Table 7 shows a mixture of LSR, gel, and fillers that yield a suitable combination of viscosity, softness, and electrical resistivity.

TABLE 7

|  | AH | AI |
|---|---|---|
| Components |  |  |
| LIM 6010A | 6.88 | 12.48 |
| LIM 6010B | 6.88 | 12.48 |
| SYLGARD 527 Gel A | 6.88 | 12.48 |
| SYLGARD 527 Gel B | 6.88 | 12.48 |
| SYLOFF 4000 | 0 | 0.20 |
| 75% NCG | 54.35 | 0 |
| 66% NCG | 18.13 | 0 |
| AGSL-150-30TRD | 0 | 49.90 |
| TOTAL | 100 | 100 |

TABLE 7-continued

|  | AH | AI |
|---|---|---|
| Properties |  |  |
| Viscosity (kilo cps) | 130 | 192 |
| Durometer (Shore A) | 40 | 30 |
| Volume Resistivity (ohm-cm) | 0.10 | 0.005 |
| Compression Set (%) | 27 | 21 |

While preferred embodiments have been shown and described, various modifications and substitutions may be made thereto without departing from the spirit and scope of the invention. Accordingly, it is to be understood that the present invention has been described by way of illustration and not limitations.

What is claimed is:

1. An electrically conductive, cured silicone formed from a curable, castable composition comprising
   an electrically conductive filler; and
   an organopolysiloxane mixture having a viscosity of less than about 100,000 cps, the mixture comprising
      a catalyst that promotes cure of the curable composition,
      an organopolysiloxane having at least two alkenyl groups per molecule,
      an organopolysiloxane having at least two silicon-bonded hydrogen atoms per molecule, and
      an organopolysiloxane gel formulation; wherein the cured silicone has a Shore A Durometer hardness of less than or equal to about 60 measured according to ASTM D-2240, a compression set resistance of less than about 35% measured according to ASTM D-395-Method B at 100° C. under 25% compression for 70 hours, and a volume resistivity of less than about $10^6$ ohm-cm.

2. The cured silicone of claim 1, wherein the electrically conductive filler is a particulate comprising a metal or a metal alloy.

3. The cured silicone of claim 2, having a Shore A Durometer hardness of less than about 50, a compression set resistance of less than or equal to about 30% measured at 100° C. under 25% compression for 70 hours, and a volume resistivity less than or equal to about $10^2$ ohm-cm, and greater than or equal to about $10^{-4}$ ohm-cm when cured.

4. The cured silicone of claim 1, wherein the particulate metal or metal alloy is selected from the group consisting of gold, silver, nickel, copper, and alloys comprising at least one of the foregoing metals.

5. The cured silicone of claim 2, wherein the electrically conductive filler is a mixture comprising nickel coated graphite having an average longest dimension of about 45 micrometers and nickel-coated graphite having an average longest dimension of about 90 micrometers.

6. The cured silicone of claim 2, wherein the organopolysiloxane having at least two alkenyl groups per molecule is represented by the formula:

$$M_a D_b T_c Q_d,$$

wherein
   the subscripts a, b, c, and d are zero or a positive integer, subject to the limitation that if subscripts a and b are both equal to zero, subscript c is greater than or equal to two;
   M has the formula $R_3SiO_{1/2}$;

D has the formula $R_2SiO_{2/2}$;

T has the formula $R\,SiO_{3/2}$; and

Q has the formula $SiO_{4/2}$, wherein each R group independently represents hydrogen, alkenyl groups, substituted and unsubstituted monovalent hydrocarbon groups having from one to forty carbon atoms each, subject to the limitation that at least two of the R groups are alkenyl groups; and wherein the organopolysiloxane having at least two silicon-bonded hydrogen atoms per molecule is generally represented by the formula:

$$M_a'D_b'T_c'Q_d'$$

wherein the subscripts a, b, c, and d are zero or a positive integer, subject to the limitation that if subscripts a and b are both equal to zero, subscript c is greater than or equal to two;

M' has the formula $R_3SiO_{1/2}$;

D' has the formula $R_2SiO_{2/2}$;

T' has the formula $RSiO_{3/2}$; and

Q' has the formula $SiO_{4/2}$, wherein each R group independently represents hydrogen, substituted and unsubstituted monovalent hydrocarbon groups having from one to forty carbon atoms each, subject to the limitation that at least two of the R groups are hydrogen.

7. The cured silicone of claim 1, wherein the electrically conductive filler is nickel-coated graphite.

8. The cured silicone of claim 7, wherein the nickel-coated graphite comprises 60 wt. % nickel and has an average longest dimension of about 90 micrometers.

9. The cure silicone of claim 1, wherein the electrically conductive filler comprises a ceramic substrate having a silver metal containing coating.

10. The cured silicone of claim 1, wherein the electrically conductive filler comprises about 20 to about 85 wt % of the total weight of the composition.

11. The cured silicone of claim 1, wherein the electrically conductive filler has an average longest dimension of about 35 to about 150 micrometers.

12. The cured silicone of claim 1, further comprising a cure retardant in an amount of less than or equal to about 0.3 weight percent, based on the total weight of the organopolysiloxane mixture.

13. The cured silicone of claim 1, further comprising a cross linking agent in an amount of less than or equal to about 0.5 weight percent, based on the total weight of the organopolysiloxane mixture.

14. The cured silicone of claim 1, wherein the organopolysiloxane gel formulation is a two-part formulation comprising an organopolysiloxane having at least two alkenyl groups per molecule and an organopolysiloxane having at least two silicon-bonded hydrogen atoms per molecule, and the organopolysiloxane having at least two silicon-bonded hydrogen atoms per molecule in the gel formulation provides 0.1 to less than 1.0 silicone-bonded hydrogen atoms per alkenyl group.

15. The cured silicone of claim 1, wherein the organopolysiloxane gel formulation comprises about 5 to about 80 wt. % of the total organopolysiloxane mixture.

16. The cured silicone of claim 1, further comprising an organopolysiloxane fluid having a viscosity of less than about 1000 cps.

17. The cured silicone of claim 16, wherein the organopolysiloxane fluid has a boiling point greater than or equal to about 260° C. (500° F.).

18. The cured silicone of claim 6, wherein the organopolysiloxane fluid is a non-reactive fluid, reactive fluid, or combination comprising at least one of the foregoing having a boiling point greater than or equal to about 260° C.

19. The cured silicone of claim 1, wherein the organopolysiloxane fluid has a viscosity less than or equal to about 750 cps.

20. The cured silicone of claim 1, wherein the organopolysiloxane mixture has a viscosity of less than about 100,000 cps.

21. The cured silicone of claim 1, wherein the organopolysiloxane mixture has a viscosity of less than about 50,000 cps.

22. The cured silicone of claim 1, wherein the organopolysiloxane mixture has a viscosity of less than 35,000 cps.

23. The cured silicone of claim 1, wherein the electrically conductive filler comprises about 10 to about 90 wt %, of the total weight of the composition.

24. An article manufactured from the composition of claim 1.

25. A gasket manufactured from the composition of claim 1.

26. A method of making a cured silicone sheet, comprising: casting the composition of claim 1 onto a sheet; and allowing the composition to cure.

* * * * *